United States Patent
Hallquist

(10) Patent No.: US 9,292,632 B2
(45) Date of Patent: Mar. 22, 2016

(54) METHODS AND SYSTEMS FOR PROVIDING DETAILED RIGID WALL FORCE SUMMARY IN A TIME-MARCHING SIMULATION OF A VEHICLE COLLIDING WITH A RIGID WALL

(71) Applicant: Livermore Software Technology Corporation, Livermore, CA (US)

(72) Inventor: John O. Hallquist, Livermore, CA (US)

(73) Assignee: Livermore Software Technology Corp., Livermore, CA (US)

(*) Notice: Subject to any disclaimer, the term of this patent is extended or adjusted under 35 U.S.C. 154(b) by 492 days.

(21) Appl. No.: 13/895,584

(22) Filed: May 16, 2013

(65) Prior Publication Data

US 2014/0343902 A1    Nov. 20, 2014

(51) Int. Cl.
*G06F 7/60* (2006.01)
*G06F 17/10* (2006.01)
*G06F 17/50* (2006.01)
*G06T 17/20* (2006.01)

(52) U.S. Cl.
CPC ........ *G06F 17/5009* (2013.01); *G06F 17/5018* (2013.01); *G06T 17/20* (2013.01); *G06F 17/5095* (2013.01); *G06F 2217/16* (2013.01)

(58) Field of Classification Search
CPC . G06F 17/5009; G06F 17/50; G06F 17/5018; G06F 17/5095; G06F 2217/16; G06F 17/20; G06T 17/20
USPC ...................................................... 703/8, 2, 6
See application file for complete search history.

(56) References Cited

U.S. PATENT DOCUMENTS 8,180,605 B1 * 5/2012 Zhu ..................... G06F 17/5018
703/1

OTHER PUBLICATIONS

Zaouk, Abdullatif K. et al., "Validation of a Non-Linear Finite Element Vehicle Model", 1996, ASME Applied Mechanics Division-Publications-AMD 218.*
Kuschfeldt, Sven et al., "Case Study: Efficient Visualization of Physical and Structural Properties in Crash-Worthiness Simulations", 1997, Proceedings of the 8th IEEE Visualizations '97, IEEE.*
Kurtaran, H. et al., "Crashworthines Design Optimization Using Successive Response Surface Approximations", 2002, Computational Mechanics 29, Springer-Verlag.*
Hou, Shujuan et al., "Multiobjective Optimization of Multi-cell Sections for the Crashworthiness Design", Mar. 2008, International Journal of Impact Engineering 35, Elsevier Ltd.*

(Continued)

*Primary Examiner* — Kamini S Shah
*Assistant Examiner* — Cedric D Johnson
(74) *Attorney, Agent, or Firm* — Roger H. Chu

(57) ABSTRACT

A finite element analysis (FEA) model of a vehicle and a rigid wall definition are received. The FEA model comprises a number of nodes connected by finite elements that are organized in groups. The rigid wall comprises one or more segments each corresponding to a load cell installed thereon. A list of groups that are desired to have a detailed rigid wall force (RWF) summary is defined by user. A contribution weighting factor is calculated for each node in the FEA model. A time-marching simulation of the vehicle colliding with the rigid wall is conducted. At each solution cycle, a nodal force contribution is calculated for each node according to node type. The calculated nodal force contribution modified with the contribution weighting factor is accumulated in the detail RWF summary under respective groups and segments. A full detailed RWF summary is presented.

17 Claims, 9 Drawing Sheets

(56) References Cited

OTHER PUBLICATIONS

Khattab, Ahmed Abd El-Rahman, "Investigation of an Adaptable Crash Energy Management System to Enhance Vehicle Crashworthiness", Oct. 2010, Department of Mechanical and Industrial Engineering, Concordia University.*

Mahadevaiah, Umashankar, "Development and Validation of New Algorithms to Improve Contact Detection and Robustness in Finite Element Simulations", May 17, 2009, School of Engineering and Applied Science, The George Washington University.*

Hou, Shujuan et al., "Design Optimization of Regular Hexagonal Thin-Walled Columns with Crashworthiness Criteria", Feb. 15, 2007, Finite Elements in Analysis and Design 43, Elsevier B.V.*

Xu, Rong-zheng et al., "The Finite Element Analysis of the Coach Body Frontal Crash and Structure Improvement", Aug. 11-14, 2011, International Conference on Electronic & Mechanical Engineering and Information Technology, IEEE.*

* cited by examiner

METHODS AND SYSTEMS FOR PROVIDING DETAILED RIGID WALL FORCE SUMMARY IN A TIME-MARCHING SIMULATION OF A VEHICLE COLLIDING WITH A RIGID WALL

FIELD OF THE INVENTION

The present invention generally relates to computer aided engineering analysis, more particularly to methods and systems for providing detailed rigid wall force summary in a time-marching simulation of a vehicle (e.g., an automobile) colliding with a rigid wall.

BACKGROUND

Computer aided engineering (CAE) has been used for supporting engineers in many tasks. For example, in a structure or product design procedure, CAE analysis, in particular finite element analysis (FEA), has often been employed to evaluate responses (e.g., stresses, displacements, etc.) under various loading conditions (e.g., static or dynamic). One of the most important computer simulations is to simulate a vehicle colliding with a rigid wall. The rigid wall can be either stationary or moving. Generally, the vehicle is moving into a rigid wall fixed in space. However, in simulating roof crushing of an automobile, the rigid wall moves into a stationary automobile. Such a simulation can be used for assisting a user to design automobiles to meet the safety requirements. One of the key information gathered is the rigid wall force (RWF) caused by the impact between the automobile and the rigid wall. A total rigid wall force summary is provided in such a numerical simulation according to prior art approaches. However, automotive engineers would like to learn the spatial distribution of the total rigid wall force, so that a better automobile can be designed and/or built. In physical prototype crash tests, a number of load cells each attached to a segment of the rigid wall are generally installed to determine the spatial force distribution (i.e., RWF at various locations or segments on the rigid wall). However, this force distribution information does not provide any detail as to how each vehicle structural component contributes to the total rigid wall force. Such detailed information cannot be obtained experimentally for complex vehicle structures. Design engineers use this information for determining the load path through the vehicle in the structural component design and modification. It would, therefore, be desirable to have methods and systems for providing detailed rigid wall force summary in a time-marching numerical simulation of a vehicle colliding with a rigid wall.

SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

Methods and systems for providing detailed rigid wall force summary in a time-marching simulation of a vehicle colliding with a rigid wall are disclosed. According to one aspect of the present invention, a computerized model (e.g., finite element analysis (FEA) model) of a vehicle and a rigid wall definition are received in a computer system with a finite element analysis application module installed thereon. The FEA model comprises a number of nodes connected by finite elements that are organized in groups. The rigid wall comprises one or more segments each corresponding to a load cell installed thereon. A list of groups (i.e., a list of nodes, a list of finite elements, a structural part of a vehicle (e.g., a bumper or a portion of a bumper), etc.) that are desired to have a detailed rigid wall force (RWF) summary is defined by user (i.e., engineer and/or scientist responsible for automobile design and/or manufacturing). Each of the groups can interact with an arbitrary number of rigid wall segments. If there is no list of groups defined, a default list can be created (e.g., including all structural parts in the FEA model in the list). A contribution weighting factor is calculated for each node in the FEA model. When a node belongs to only one group in the list, the contribution weight factor is unity (i.e., the nodal force contribution to the RWF is entirely to that group). When a node is shared by more than one group, corresponding contribution weighting factor for each of the groups is calculated. In one embodiment, the contribution weighting factor is determined by the number of groups that share the node. In another embodiment, the contribution weighting factor is determined by ratio between the groups (e.g., area, mass, or volume ratio).

A time-marching simulation of the automobile colliding with the rigid wall is conducted using the FEA model. At each solution cycle, a nodal force contribution is calculated for each node according to node type. Then, for each segment of the rigid wall, the calculated nodal force contributions modified with the nodal contribution weighting factor are summed for each group that has one or more nodes that contact the segment. The total segment force is determined by summing the nodal force contributions modified with the nodal contribution weighting factor of all nodes that are in contact with the segment. The total force acting on the rigid wall is the summation of the segment forces. The total force imparted by a group to the rigid wall is found by the summation of the forces imparted by a group on each segment. A full detailed RWF summary (e.g., the RWF time history of a particular group for a specific segment) is presented.

One object of the present invention is to allow detailed breakdown of the force contributed from each part (i.e., group of finite elements that are desired to have detailed RWF summary) of a vehicle to respective spatial locations (i.e., segments) of the rigid wall in numerical simulations of automobile crash.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-7. However, those skilled in the art will readily appreciate that the detailed description given herein with respect to these figures is for explanatory purposes as the invention extends beyond these limited embodiments.

Figure 1A:
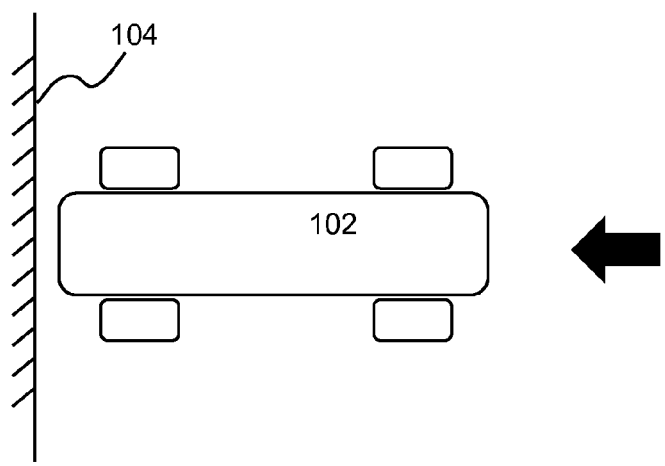
FIGS. 1A and 1B are top and side view of a schematic diagram showing an exemplary automobile colliding with a rigid wall.
Figure 1B:
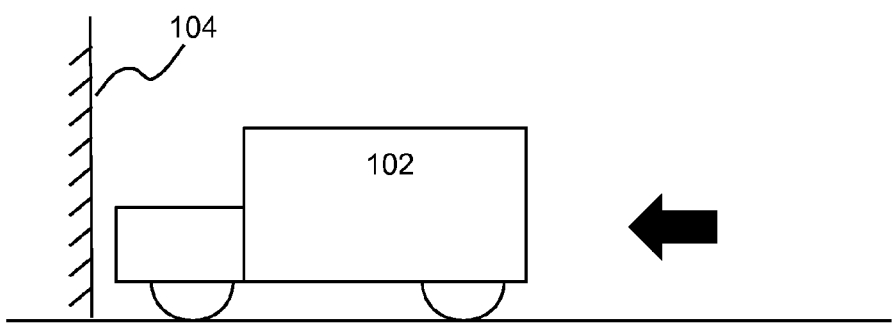
Figure 1C:
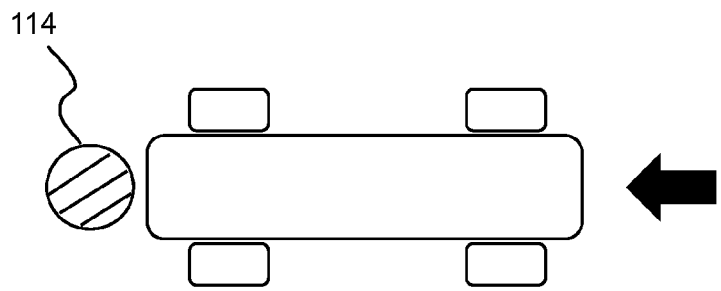
FIG. 1C is a schematic diagram showing an exemplary automobile colliding with a rigid pole.
Figure 1D:
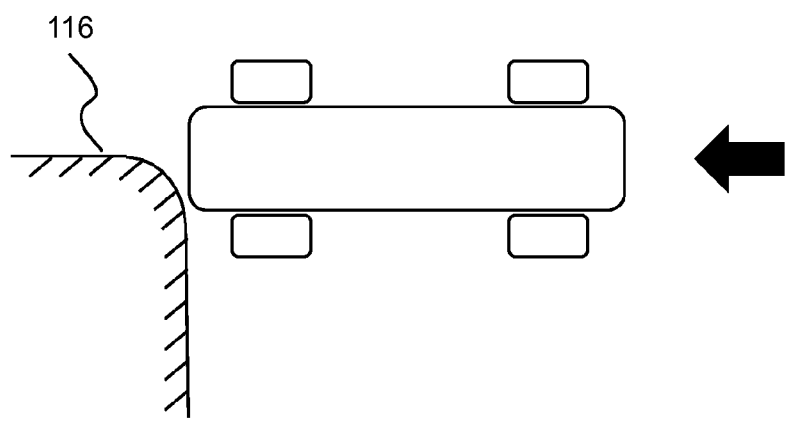
FIG. 1D is a schematic diagram showing an exemplary automobile colliding with a rigid corner.

Methods and systems for providing detailed rigid wall force (RWF) summary in a time-marching simulation of a vehicle colliding with a rigid wall are disclosed. FIGS. 1A-1B show top and side views of a schematic diagram of an exemplary automobile 102 colliding with a rigid wall 104. A time-marching simulation of such an impact event has been conducted in a computer system having an application module (e.g., a finite element analysis software package) installed thereon. The rigid wall 104 is shown as a flat wall. For those having ordinary skill in the art would know that other types of rigid wall can also be used, for example, a rigid pole 114 shown in FIG. 1C, a rigid corner 116 shown in FIG. 1D, etc.

Figure 2A:
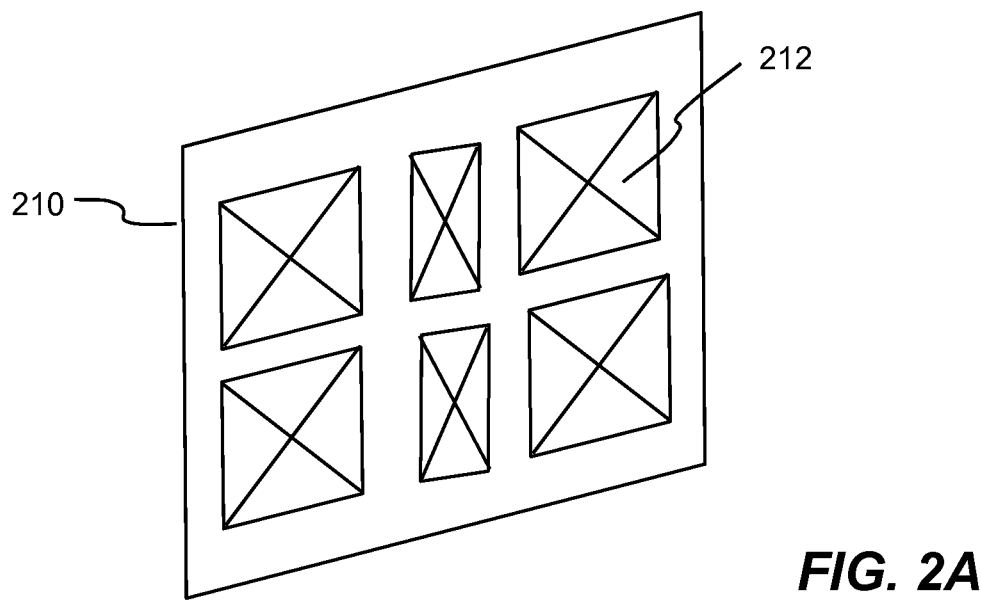
FIG. 2A is a diagram showing an exemplary rigid wall having a number of load cells deposed thereon, according to an embodiment of the present invention.
Figure 2B:
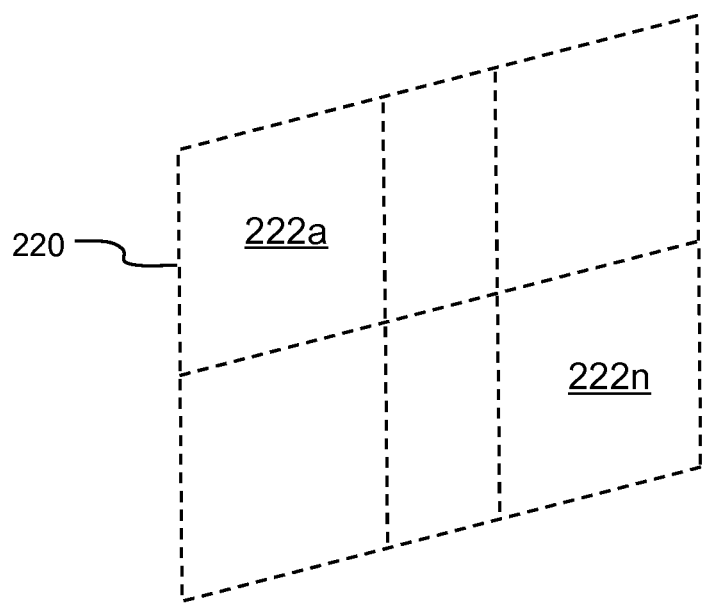
FIG. 2B is a diagram showing a rigid wall definition having a number of segments each corresponding to one of the load cells of FIG. 2A, according to an embodiment of the present invention.

FIG. 2A shows an exemplary rigid wall 210 with a number of load cells 212 deposed thereon. Corresponding rigid wall definition 220 including respective segments 222a-222n is shown in FIG. 2B. Also, the rigid wall can be either stationary or moving. Generally, the vehicle moves towards a rigid wall fixed in space in a simulation of frontal crash. However, a moving rigid wall is used in a roof crush simulation.

Figure 6A:
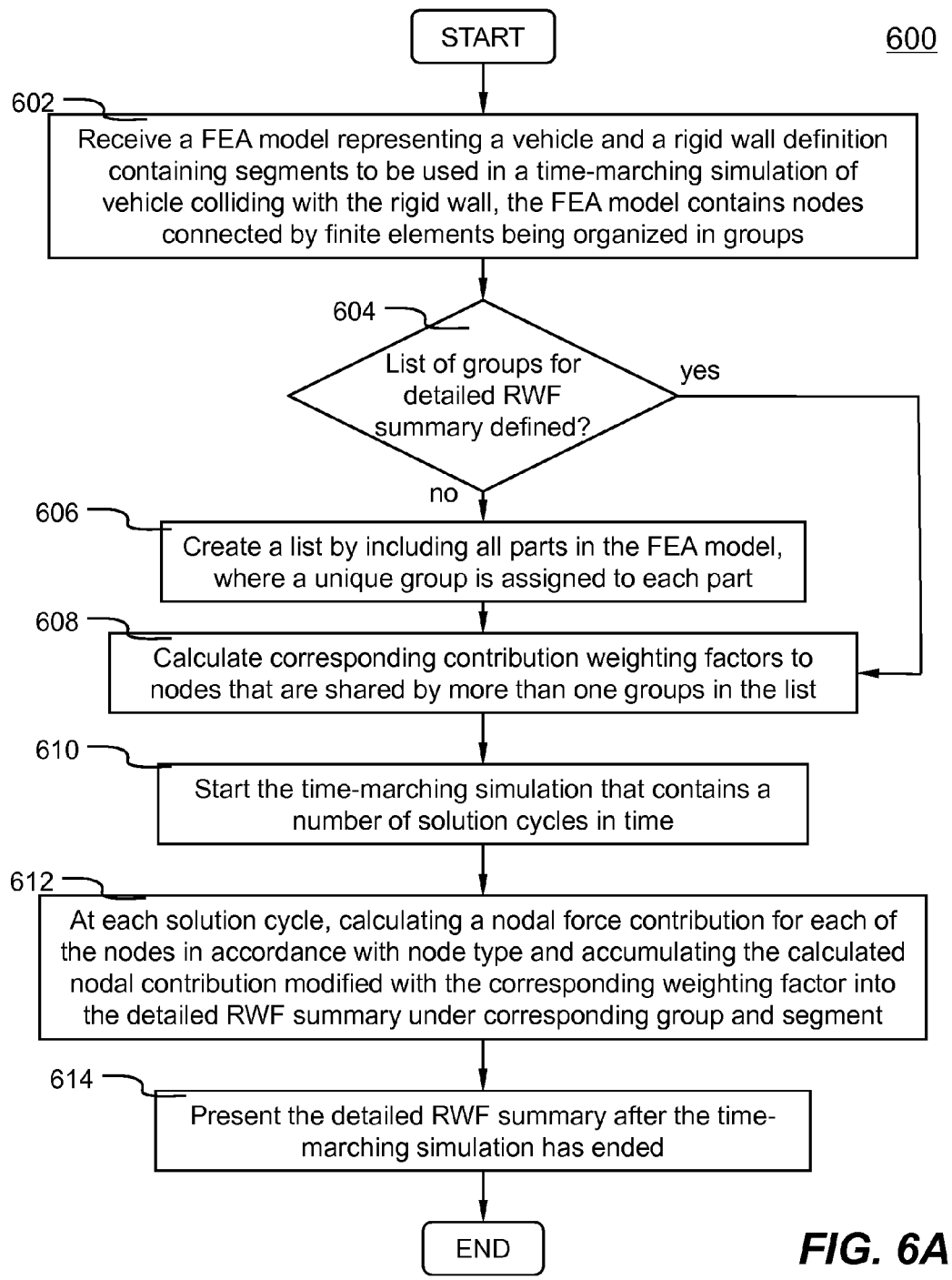
FIGS. 6A-6B are collectively a flowchart illustrating an exemplary process of providing detailed rigid wall force summary in a time-marching simulation of a vehicle colliding with a rigid wall, according to an embodiment of the present invention.
Figure 6B:
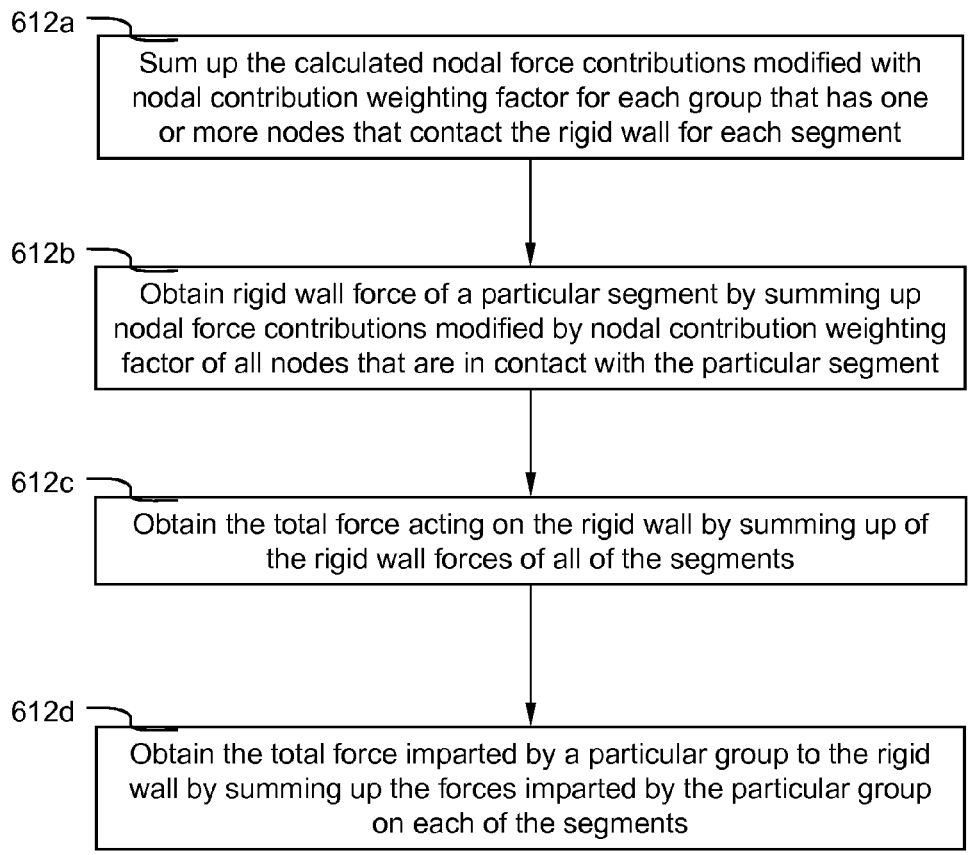

Referring now to FIG. 6A, it shows a flowchart illustrating an exemplary process 600 of providing detailed rigid wall force summary in a time-marching simulation of a vehicle colliding with a rigid wall, according to an embodiment of the present invention. Process 600 is preferably implemented in software.

Process 600 starts by receiving a finite element analysis (FEA) model representing a vehicle (e.g., an automobile) and a rigid wall definition in a computer system (e.g., computer system 700 in FIG. 7) at step 602. The FEA model is used for obtaining structural behaviors of the vehicle in an impact event in a time-marching simulation. The computer system has a finite element analysis application module installed thereon. The FEA model contains a plurality of nodes connected by a plurality of finite elements being organized in groups. Each group can include a list of nodes, a list of finite elements, a structural part, or a portion of a part. In one embodiment, each group represents a part of the vehicle. For example, shown in FIG. 3, a FEA model 300 of an exemplary vehicle is organized by groups of finite elements (not explicitly shown). Such division scheme is to allow detailed RWF summary to include contribution from each of the groups. Further in FIG. 3, bumper 311, fenders 312, car body 313, wheels 314 and hood 315 are shown. It is noted that other schemes may be used to achieve the same. For example, bumper 313 may be divided into more than one group (i.e., portion of a structural part).

Next at decision 604, it is determined whether a list of groups that are desired to have detailed rigid wall force summary is defined by user. If not, a list of groups is created with a predefined scheme (e.g., including each part in the FEA as a group) at step 606. Otherwise, process 600 follows the 'yes' branch to step 608, in which contribution weighting factors for all nodes of the FEA model are either assigned or calculated. To those nodes belong to only one group, the contribution weighting factor of unity (1.0) is assigned. For those nodes shared by more than one group in the list, corresponding weighting factors are calculated using a predetermined scheme, for example, based on number of the groups sharing the node, based on a ratio amongst the groups sharing the node, etc.

Figure 4A:
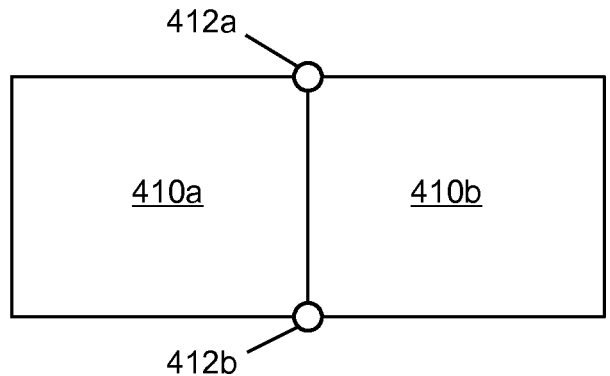
FIGS. 4A-4C are schematic diagrams showing various exemplary nodes being shared by more than one group of finite elements, according to an embodiment of the present invention.
Figure 4B:
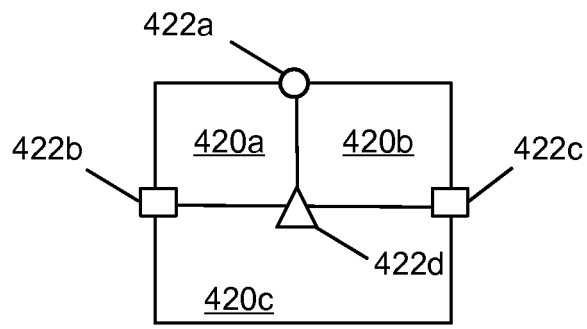
Figure 4C:
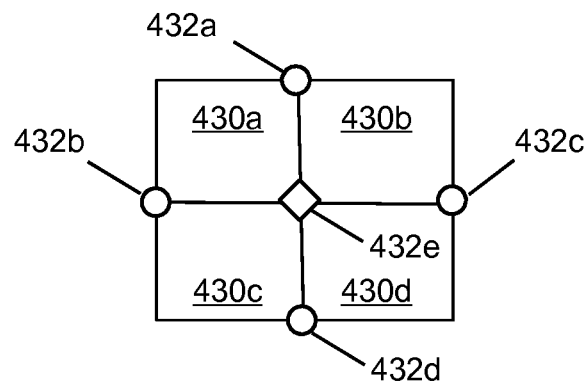

For a node shared by multiple groups, the summation of the weighting factors assigned to the node in each group equals unity. FIG. 4A shows two groups 410a-410b share two nodes 412a-412b. FIG. 4B show three groups 420a-420c share various nodes 422a-422d. FIG. 4C show four groups 430a-430d share nodes 432a-432e. Using the number of groups sharing a node as criterion, the contribution weighting factor is 50% for nodes 412a-412b as each contributes 50% to neighboring groups 410a-410b, respectively. For the example shown in FIG. 4B, the contribution weighting factors are 50% for nodes 422a-422c and 33% for nodes 422d to respective neighboring groups. In the example shown in FIG. 4C, the contribution weighting factors are 50% for nodes 432a-432d and 25% for node 432e to respective neighboring groups.

If an area or a volume ratio is used as calculation basis, the contribution weighting factors for node 422d may be 25% for groups 420a and 420b and 50% for group 420c. Similarly, the contribution weighting factors for nodes 422*b* and 422*c* may be 33% for groups 420*a* and 420*b*, respectively, and 67% for group 420*c*.

Next, at step 610, a time-marching simulation of the vehicle colliding with the rigid wall is conducted using the FEA model and the rigid wall definition. The time-marching simulation contains a plurality of solution cycles in time. At each solution cycle, nodal force contribution of each of the nodes in the FEA model is calculated according to the node type at step 612. The calculated nodal force contribution is then modified with corresponding weighting factor before accumulated into the detailed RWF summary under corresponding group and segment. In one embodiment, shown in FIG. 6B, for each segment of the rigid wall, the calculated nodal force contributions modified with the nodal contribution weighting factor are summed for each group that has one or more nodes that contact the segment at step 612*a*. The total segment force is determined by summing the nodal force contributions modified with the nodal contribution weighting factor of all nodes that are in contact with the segment at step 612*b*. The total force acting on the rigid wall is the summation of the segment forces at step 612*c*. The total force imparted by a group to the rigid wall is found by the summation of the forces imparted by a group on each segment at step 612*d*.

The nodal force contribution vector includes the force normal to the rigid wall and two tangential forces representing the frictional components when friction option is activated in the time-marching simulation (i.e., friction is included in the simulation). The following formula are used for calculating the nodal force contribution:

For a regular node being modeled with appropriate nodal mass:

$$F_{NODE} = M_{NODE}(A^+ - A^-)$$

where: $F_{NODE}$ is the nodal force contribution vector,
$M_{NODE}$ is scalar nodal mass,
$A^+$ is nodal acceleration vector after contact with the rigid wall, and
$A^-$ is nodal acceleration vector before contact with the rigid wall.

For a node being modeled without an accurate nodal mass under a penalty formulation (e.g., a node in a rigid body):

$$F_{NODE} = F^n + F^t$$

$$F^n = (K\Delta u)\underline{n}$$

where: $F_{NODE}$ is the nodal force contribution vector,
$F^n$ is the nodal force contribution normal to the rigid wall,
K is the assigned stiffness (i.e., the penalty) in the penalty formulation,
Δu is the penetration of the node (i.e., node modeled without an accurate nodal mass) through the rigid wall,
$\underline{n}$ is a unit normal vector to the rigid wall, and
$F^t$ is the frictional forces orthogonal to the normal force (to be included when the friction option is activated in the simulation).

In one embodiment, assigned stiffness for a node in a rigid body is determined by the material property of the rigid body.

Figure 5:
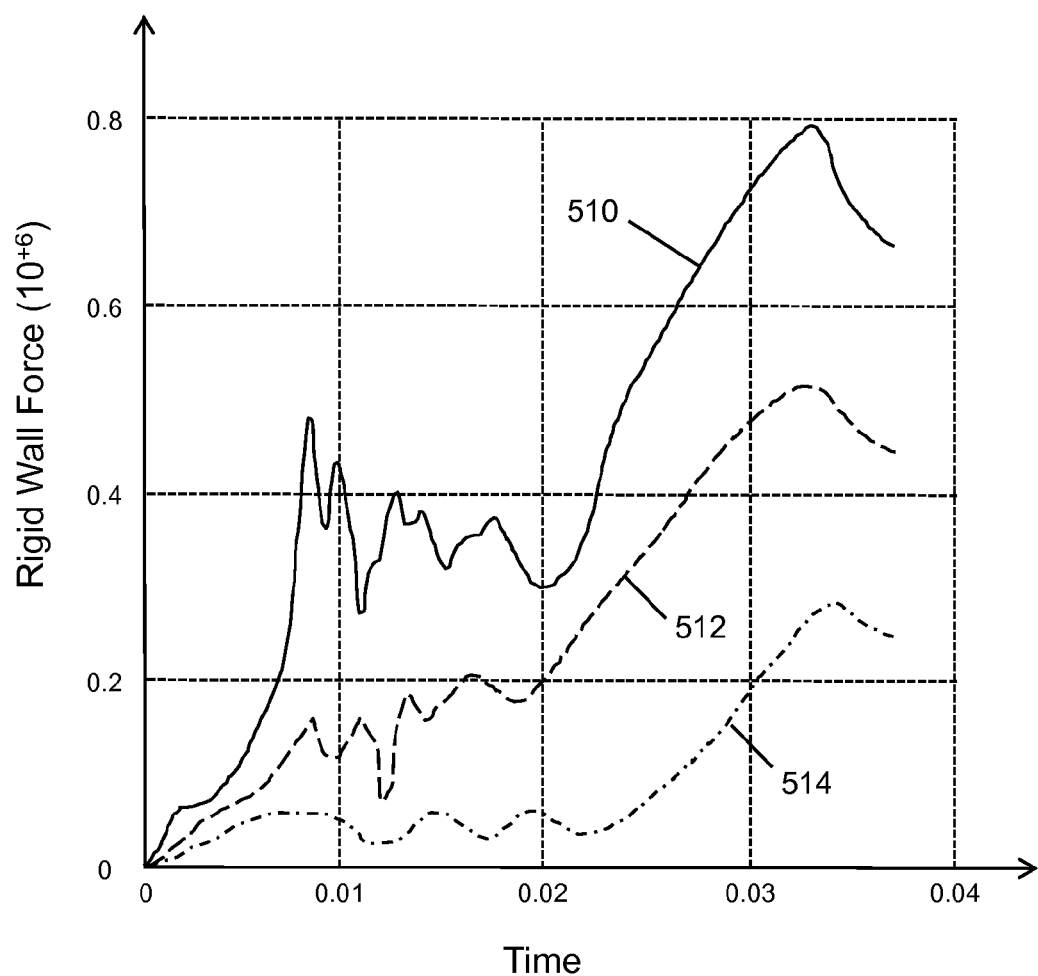
FIG. 5 is a diagram showing an exemplary detailed rigid wall force summary in accordance with an embodiment of the present invention.

Finally, at step 614, the detailed RWF summary is presented after the time-marching simulation has ended. The detailed RWF summary can be presented in various forms. In one example, rigid wall force versus time is shown in FIG. 5. Three different groups are shown in stacked curves. Total rigid wall force is shown as curve 510, while curves 512 and 514 are force contributions at two different segments (i.e., two separate spatial locations) of the rigid wall. In another embodiment, RWF time history of a particular group of finite elements for a specific segment may be used (not shown). In yet another embodiment, RWF time history of a single group interacting with all segments may be used (not shown). Process 600 ends thereafter.

Figure 7:
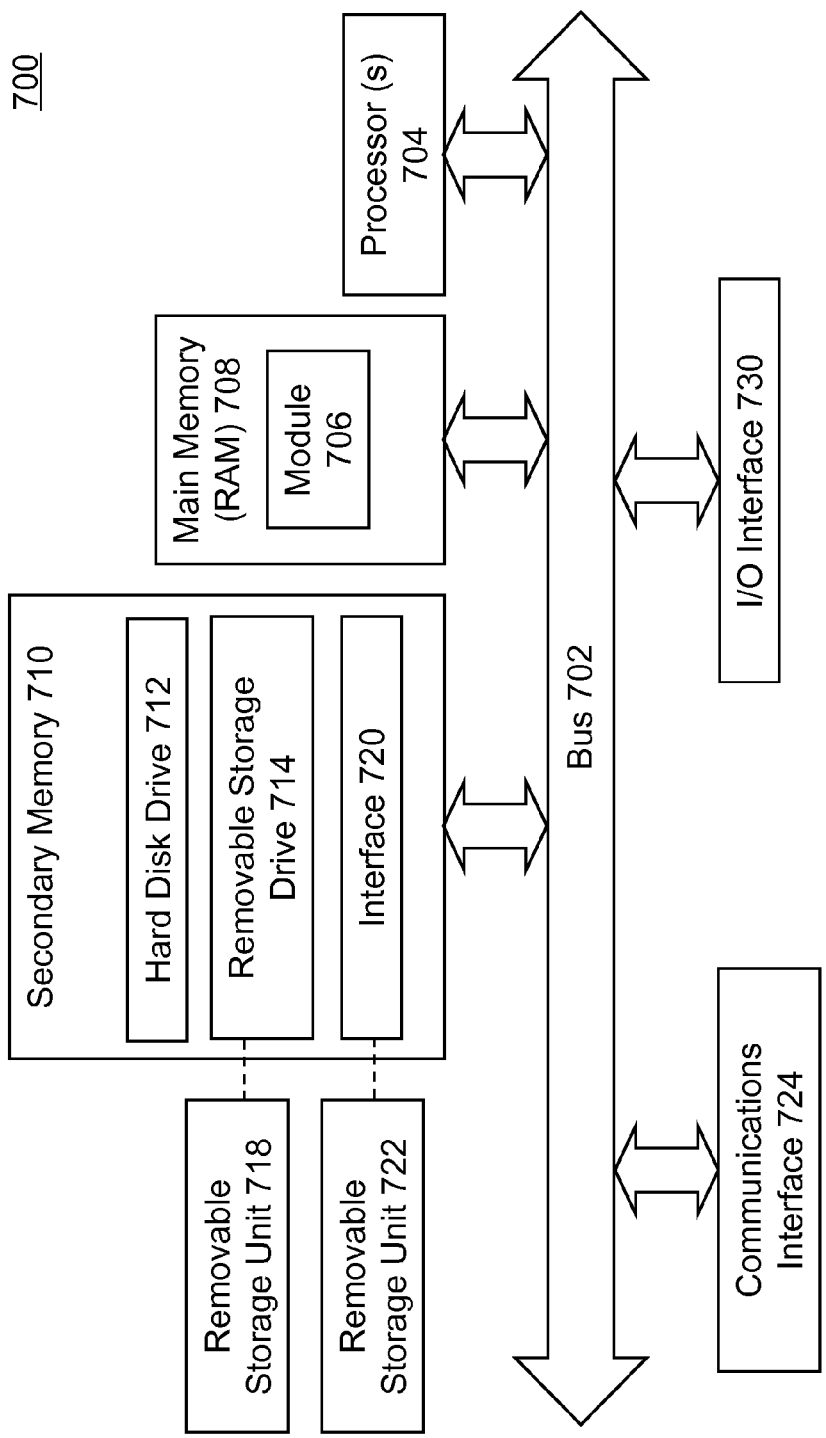
FIG. 7 is a function diagram showing salient components of an exemplary computer system, in which an embodiment of the present invention may be implemented.

According to one aspect, the present invention is directed towards one or more computer systems capable of carrying out the functionality described herein. An example of a computer system 700 is shown in FIG. 7. The computer system 700 includes one or more processors, such as processor 704. The processor 704 is connected to a computer system internal communication bus 702. Various software embodiments are described in terms of this exemplary computer system. After reading this description, it will become apparent to a person skilled in the relevant art(s) how to implement the invention using other computer systems and/or computer architectures.

Computer system 700 also includes a main memory 708, preferably random access memory (RAM), and may also include a secondary memory 710. The secondary memory 710 may include, for example, one or more hard disk drives 712 and/or one or more removable storage drives 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to by removable storage drive 714. As will be appreciated, the removable storage unit 718 includes a computer readable medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 722 and interfaces 720 which allow software and data to be transferred from the removable storage unit 722 to computer system 700. In general, Computer system 700 is controlled and coordinated by operating system (OS) software, which performs tasks such as process scheduling, memory management, networking and I/O services.

There may also be a communications interface 724 connecting to the bus 702. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc.

The computer 700 communicates with other computing devices over a data network based on a special set of rules (i.e., a protocol). One of the common protocols is TCP/IP (Transmission Control Protocol/Internet Protocol) commonly used in the Internet. In general, the communication interface 724 manages the assembling of a data file into smaller packets that are transmitted over the data network or reassembles received packets into the original data file. In addition, the communication interface 724 handles the address part of each packet so that it gets to the right destination or intercepts packets destined for the computer 700.

In this document, the terms "computer recordable storage medium", "computer recordable medium" and "computer readable medium" are used to generally refer to media such as removable storage drive 714, and/or a hard disk installed in hard disk drive 712. These computer program products are means for providing software to computer system 700. The invention is directed to such computer program products.

The computer system 700 may also include an input/output (I/O) interface 730, which provides the computer system 700 to access monitor, keyboard, mouse, printer, scanner, plotter, and alike.

Computer programs (also called computer control logic) are stored as application modules 706 in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform features of the present invention. Accordingly, such computer programs represent controllers of the computer system 700.

In an embodiment where the invention is implemented using software, the software may be stored in a computer program product and loaded into computer system 700 using removable storage drive 714, hard drive 712, or communications interface 724. The application module 706, when executed by the processor 704, causes the processor 704 to perform the functions of the invention as described herein.

The main memory 708 may be loaded with one or more application modules 706 that can be executed by one or more processors 704 with or without a user input through the I/O interface 730 to achieve desired tasks. In operation, when at least one processor 704 executes one of the application modules 706, the results are computed and stored in the secondary memory 710 (i.e., hard disk drive 712). The status of the time-marching simulation (e.g., results due to impact, etc.) is reported to the user via the I/O interface 730 either in a text or in a graphical representation.

Figure 3:
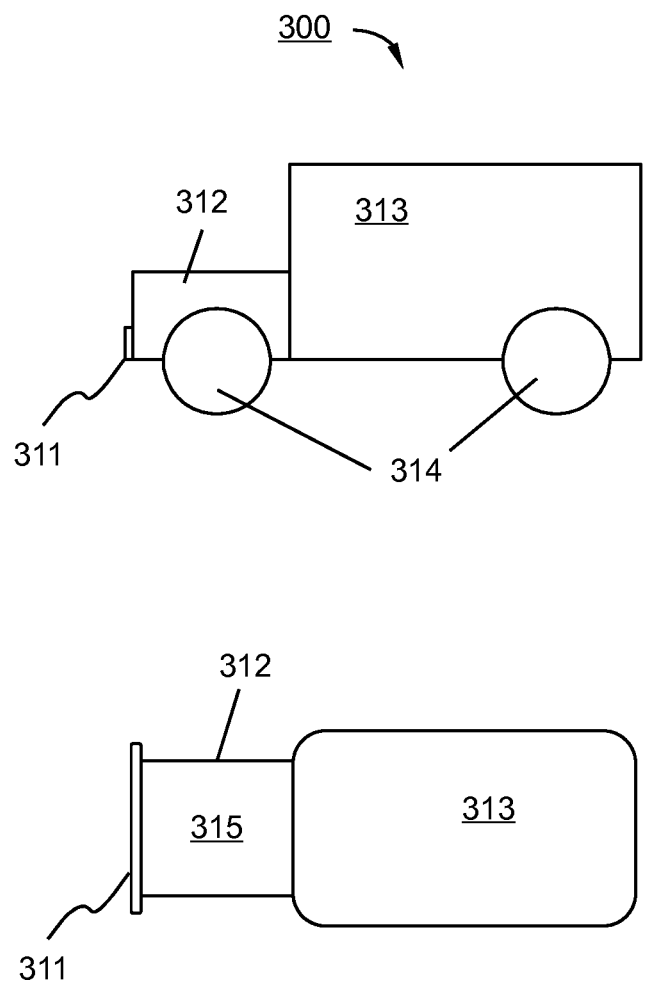
FIG. 3 is a schematic diagram showing an exemplary finite element analysis model of a vehicle being organized with a number of groups, according to an embodiment of the present invention.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas a predefined scheme of including all of the groups into a default list has been described and shown, other equivalent schemes can be used to achieve the same, for example, including a particular group of interest. Additionally, only one exemplary grouping scheme is shown in FIG. 3, the FEA model can be divided in unlimited number of schemes. Further, few exemplary contribution weighting factors have been shown and described. Other schemes may be used for achieving the same. Finally, only one example of detailed RWF summary is shown in FIG. 5. Other means for presenting the detailed RWF summary may be used in either text or graphical form. In summary, the scope of the invention should not be restricted to the specific exemplary embodiments disclosed herein, and all modifications that are readily suggested to those of ordinary skill in the art should be included within the spirit and purview of this application and scope of the appended claims.

I claim:

1. A method of providing detailed rigid wall force summary in a time-marching simulation of a vehicle colliding with a rigid wall comprising:

receiving a finite element analysis (FEA) model and a rigid wall definition in a computer system having a FEA application module installed thereon, the FEA model representing a vehicle and the rigid wall definition, wherein the FEA model and the rigid wall definition are to be used in a time-marching simulation of the vehicle colliding with the rigid wall, the FEA model contains a plurality of nodes connected by a plurality of finite elements being organized into one or more groups, and the rigid wall definition contains one or more segments representing corresponding spatial locations on the rigid wall;

determining whether a list of the groups desirous to have a detailed rigid wall force (RWF) summary is defined;

if not, creating the list by including all structural parts of the vehicle;

calculating one or more contribution weighting factors for each of the nodes for one or more groups in the list, respectively;

starting the time-marching simulation that contains a plurality of solution cycles in time;

at each of the solution cycles, calculating a nodal force contribution of each of the nodes in accordance with a node type and accumulating the calculated nodal force contribution modified with the corresponding contribution weighting factor into the detailed RWF summary under corresponding one of the groups for corresponding one of the segments, wherein said accumulating the calculated nodal force contribution modified with the corresponding contribution weighting factor into the detailed RWF summary further comprises:

summing up the calculated nodal force contributions modified with nodal contribution weighting factor for each of the groups that has one or more nodes that contact with the rigid wall for each of the segments;

obtaining rigid wall force of a particular segment by summing up the calculated nodal force contribution modified with nodal contribution weighting factor for all nodes that are in contact with the particular segment;

obtaining total rigid wall force by summing up all of the rigid wall forces for all of the segments; and obtaining total forces imparted by a particular group to the rigid wall by summing up the forces imparted by said particular group on all of the segments; and presenting the detailed RWF summary after the time-marching simulation has completed.

2. The method of claim 1, wherein the contribution weighing factors includes respective weighting factors for those groups that share said each node using a predefined scheme.

3. The method of claim 2, wherein the predefined scheme is based on number of said those groups share said each node.

4. A method of providing detailed rigid wall force summary in a time-marching simulation of a vehicle colliding with a rigid wall comprising:

receiving a finite element analysis (FEA) model and a rigid wall definition in a computer system having a FEA application module installed thereon, the FEA model representing a vehicle and the rigid wall definition, wherein the FEA model and the rigid wall definition are to be used in a time-marching simulation of the vehicle colliding with the rigid wall, the FEA model contains a plurality of nodes connected by a plurality of finite elements being organized into one or more groups, and the rigid wall definition contains one or more segments representing corresponding spatial locations on the rigid wall;

determining whether a list of the groups desirous to have a detailed rigid wall force (RWF) summary is defined;

if not, creating the list by including all structural parts of the vehicle;

calculating one or more contribution weighting factors for each of the nodes for one or more groups in the list, respectively;

starting the time-marching simulation that contains a plurality of solution cycles in time;

at each of the solution cycles, calculating a nodal force contribution of each of the nodes in accordance with a node type and accumulating the calculated nodal force contribution modified with the corresponding contribution weighting factor into the detailed RWF summary under corresponding one of the groups for corresponding one of the segments;

presenting the detailed RWF summary after the time-marching simulation has completed; and wherein, when the node type indicates said each node being modeled with appropriate nodal mass, the nodal force contribution is calculated as follows:

$$F_{NODE} = M_{NODE}(A^+ - A^-)$$

where $F_{NODE}$ is a vector representing the nodal force contribution, $M_{NODE}$ is scalar nodal mass, $A^+$ represents nodal acceleration vector after contact with the rigid wall, $A^-$ represents nodal acceleration vector before contact with the rigid wall.

5. The method of claim 4, wherein the nodal force contribution includes frictional forces when friction option is activated in the time-marching simulation.

6. A method of providing detailed rigid wall force summary in a time-marching simulation of a vehicle colliding with a rigid wall comprising:

receiving a finite element analysis (FEA) model and a rigid wall definition in a computer system having a FEA application module installed thereon, the FEA model representing a vehicle and the rigid wall definition, wherein the FEA model and the rigid wall definition are to be used in a time-marching simulation of the vehicle colliding with the rigid wall, the FEA model contains a plurality of nodes connected by a plurality of finite elements being organized into one or more groups, and the rigid wall definition contains one or more segments representing corresponding spatial locations on the rigid wall;

determining whether a list of the groups desirous to have a detailed rigid wall force (RWF) summary is defined;

if not, creating the list by including all structural parts of the vehicle;

calculating one or more contribution weighting factors for each of the nodes for one or more groups in the list, respectively;

starting the time-marching simulation that contains a plurality of solution cycles in time;

at each of the solution cycles, calculating a nodal force contribution of each of the nodes in accordance with a node type and accumulating the calculated nodal force contribution modified with the corresponding contribution weighting factor into the detailed RWF summary under corresponding one of the groups for corresponding one of the segments;

presenting the detailed RWF summary after the time-marching simulation has completed; and wherein, when the node type indicates said each node being modeled without nodal mass under a penalty formulation, the nodal force contribution is calculated as follows:

$$F_{NODE} = F^n + F^t$$

$$F^n = (K\Delta u)n$$

where:

$F_{NODE}$ is a vector representing the nodal force contribution, $F^n$ represents a normal portion of the nodal force contribution normal to the rigid wall, K represents assigned stiffness at said each node being modeled without nodal mass in the penalty formulation, $\Delta u$ represents nodal penetration of said each node being modeled without nodal mass through the rigid wall, n represents a unit normal vector to the rigid wall, and $F^t$ represents frictional forces orthogonal to the normal portion, when friction option is activated in the time-marching simulation.

7. A system for providing detailed rigid wall force summary in a time-marching simulation of a vehicle colliding with a rigid wall comprising:

a main memory for storing computer readable code for a finite element analysis (FEA) application module;

at least one processor coupled to the main memory, said at least one processor executing the computer readable code in the main memory to cause the FEA application module to perform operations by a method of:

receiving a finite element analysis (FEA) model and a rigid wall definition, the FEA model representing a vehicle and the rigid wall definition, wherein the FEA model and the rigid wall definition are to be used in a time-marching simulation of the vehicle colliding with the rigid wall, the FEA model contains a plurality of nodes connected by a plurality of finite elements being organized into one or more groups, and the rigid wall definition contains one or more segments representing corresponding spatial locations on the rigid wall;

determining whether a list of the groups desirous to have a detailed rigid wall force (RWF) summary is defined;

if not, creating the list by including all structural parts of the vehicle;

calculating one or more contribution weighting factors for each of the nodes for one or more groups in the list, respectively;

starting the time-marching simulation that contains a plurality of solution cycles in time;

at each of the solution cycles, calculating a nodal force contribution of each of the nodes in accordance with a node type and accumulating the calculated nodal force contribution modified with the corresponding contribution weighting factor into the detailed RWF summary under corresponding one of the groups for corresponding one of the segments, wherein said accumulating the calculated nodal force contribution modified with the corresponding contribution weighting factor into the detailed RWF summary further comprises:

summing up the calculated nodal force contributions modified with nodal contribution weighting factor for each of the groups that has one or more nodes that contact with the rigid wall for each of the segments;

obtaining rigid wall force of a particular segment by summing up the calculated nodal force contribution modified with nodal contribution weighting factor for all nodes that are in contact with the particular segment;

obtaining total rigid wall force by summing up all of the rigid wall forces for all of the segments; and obtaining total forces imparted by a particular group to the rigid wall by summing up the forces imparted by said particular group on all of the segments; and presenting the detailed RWF summary after the time-marching simulation has completed.

8. The system of claim 7, wherein the contribution weighing factors includes respective weighting factors for those groups that share said each node using a predefined scheme.

9. The system of claim 8, wherein the predefined scheme is based on number of said those groups share said each node.

10. The system of claim 7, wherein, when the node type indicates said each node being modeled with appropriate nodal mass, the nodal force contribution is calculated as follows:

$$F_{NODE} = M_{NODE}(A^+ - A^-)$$

where
$F_{NODE}$ is a vector representing the nodal force contribution,
$M_{NODE}$ is scalar nodal mass,
$A^+$ represents nodal acceleration vector after contact with the rigid wall,
$A^-$ represents nodal acceleration vector before contact with the rigid wall.

11. The system of claim 7, wherein, when the node type indicates said each node being modeled without nodal mass under a penalty formulation, the nodal force contribution is calculated as follows:

$$F_{NODE} = F^n + F^t$$

$$F^n = (K\Delta u)n$$

where:
$F_{NODE}$ is a vector representing the nodal force contribution,
$F^n$ represents a normal portion of the nodal force contribution normal to the rigid wall,
K represents assigned stiffness at said each node being modeled without nodal mass in the penalty formulation,
$\Delta u$ represents nodal penetration of said each node being modeled without nodal mass through the rigid wall,
n represents a unit normal vector to the rigid wall, and
$F^t$ represents frictional forces orthogonal to the normal portion, when friction option is activated in the time-marching simulation.

12. The system of claim 7, wherein the segments correspond to load cells deposed on the rigid wall.

13. A non-transitory computer readable storage medium containing instructions for providing detailed rigid wall force summary in a time-marching simulation of a vehicle colliding with a rigid wall by a method comprising:

receiving a finite element analysis (FEA) model and a rigid wall definition in a computer system having a FEA application module installed thereon, the FEA model representing a vehicle and the rigid wall definition, wherein the FEA model and the rigid wall definition are to be used in a time-marching simulation of the vehicle colliding with the rigid wall, the FEA model contains a plurality of nodes connected by a plurality of finite elements being organized into one or more groups, and the rigid wall definition contains one or more segments representing corresponding spatial locations on the rigid wall;

determining whether a list of the groups desirous to have a detailed rigid wall force (RWF) summary is defined;

if not, creating the list by including all structural parts of the vehicle;

calculating one or more contribution weighting factors for each of the nodes for one or more groups in the list, respectively;

starting the time-marching simulation that contains a plurality of solution cycles in time;

at each of the solution cycles, calculating a nodal force contribution of each of the nodes in accordance with a node type and accumulating the calculated nodal force contribution modified with the corresponding contribution weighting factor into the detailed RWF summary under corresponding one of the groups for corresponding one of the segments, wherein said accumulating the calculated nodal force contribution modified with the corresponding contribution weighting factor into the detailed RWF summary further comprises:

summing up the calculated nodal force contributions modified with nodal contribution weighting factor for each of the groups that has one or more nodes that contact with the rigid wall for each of the segments;

obtaining rigid wall force of a particular segment by summing up the calculated nodal force contribution modified with nodal contribution weighting factor for all nodes that are in contact with the particular segment;

obtaining total rigid wall force by summing up all of the rigid wall forces for all of the segments; and obtaining total forces imparted by a particular group to the rigid wall by summing up the forces imparted by said particular group on all of the segments; and presenting the detailed RWF summary after the time-marching simulation has completed.

14. The non-transitory computer readable storage medium of claim 13, wherein the contribution weighing factors includes respective weighting factors for those groups that share said each node using a predefined scheme.

15. The non-transitory computer readable storage medium of claim 14, wherein the predefined scheme is based on number of said those groups share said each node.

16. The non-transitory computer readable storage medium of claim 13, wherein, when the node type indicates said each node being modeled with appropriate nodal mass, the nodal force contribution is calculated as follows:

$$F_{NODE} = M_{NODE}(A^+ - A^-)$$

where
$F_{NODE}$ is a vector representing the nodal force contribution,
$M_{NODE}$ is scalar nodal mass,
$A^+$ represents nodal acceleration vector after contact with the rigid wall,
$A^-$ represents nodal acceleration vector before contact with the rigid wall.

17. The non-transitory computer readable storage medium of claim 13, wherein, when the node type indicates said each node being modeled without nodal mass under a penalty formulation, the nodal force contribution is calculated as follows:

$$F_{NODE} = F^n + F^t$$

$$F^n = (K\Delta u)n$$

where:
$F_{NODE}$ is a vector representing the nodal force contribution,
$F^n$ represents a normal portion of the nodal force contribution normal to the rigid wall,
K represents assigned stiffness at said each node being modeled without nodal mass in the penalty formulation,
$\Delta u$ represents nodal penetration of said each node being modeled without nodal mass through the rigid wall,
n represents a unit normal vector to the rigid wall, and $F^t$ represents frictional forces orthogonal to the normal portion, when friction option is activated in the time-marching simulation.

* * * * *